United States Patent [19]
van Driest et al.

[11] Patent Number: 4,998,261
[45] Date of Patent: Mar. 5, 1991

[54] SPREAD SPECTRUM SIGNAL DEMODULATOR

[75] Inventors: Hans van Driest, Bilthoven; Jacobus C. Haartsen, Delft; Bruce T. Tuch, De Bilt; Maarten Visee, Utrecht, all of Netherlands

[73] Assignee: NCR Corporation, Dayton, Ohio

[21] Appl. No.: 450,891

[22] Filed: Dec. 14, 1989

[30] Foreign Application Priority Data

Jul. 20, 1989 [GB] United Kingdom ............... 8916623

[51] Int. Cl.$^5$ ............................................. H04K 1/00
[52] U.S. Cl. ......................................... 375/1; 375/56;
375/84; 329/304; 364/821; 455/207; 455/214; 455/276
[58] Field of Search ...................... 364/821, 825, 861; 333/150, 154, 193, 196; 375/56, 84, 85; 329/304–305; 455/205, 207, 210, 214, 276

[56] References Cited

U.S. PATENT DOCUMENTS

| | | | |
|---|---|---|---|
| 3,770,949 | 11/1973 | Whitehouse et al. | 364/821 |
| 3,979,700 | 9/1976 | Groce | 333/150 |
| 4,054,841 | 10/1977 | Henaff et al. | 329/304 |
| 4,169,286 | 9/1979 | Uzunoglu et al. | 364/821 |
| 4,583,047 | 4/1986 | Henaff et al. | 329/304 |
| 4,647,863 | 3/1987 | Skudera, Jr. et al. | 329/304 |
| 4,672,658 | 6/1987 | Kayehrad et al. | 379/63 |
| 4,774,715 | 9/1988 | Messenger | 375/1 |

OTHER PUBLICATIONS

K. V. Lever et al., "Surface Acoustic Wave Matched Filters for Communications Systems", *The Radio and Electronic Engineer*, May 1976, pp. 237–246.

Payne Freret et al., "Applications of Spread-Spectrum Radio to Wireless Terminal Communications", *IEEE 1980 National Telecommunications Conference*, Nov. 30–Dec. 4, 1980, pp. 69.7.1–69.7.4.

Kavehrad Moshen et al., "Direct-Sequence Spread Spectrum with DPSK Modulation and Diversity for Indoor Wireless Communications", *IEEE Transactions on Communications*, Feb. 2, 1987, pp. 224–236.

Primary Examiner—Stephen C. Buczinski
Assistant Examiner—Bernarr Earl Gregory
Attorney, Agent, or Firm—Wilbert Hawk, Jr.; Albert L. Sessler, Jr.; Elmer Wargo

[57] ABSTRACT

In a digital data receiver (80) for demodulating a direct sequence spread spectrum differential phase shift keyed data signal, the signal is applied to the input transducer (140) of a SAW device (100) which has first and second output transducers (142, 144) spaced apart on the SAW substrate (130) so as to produce first and second output signals on output lines (102, 104), which are relatively delayed by a time corresponding to a symbol period. The output transducers are of identical construction and are matched to the spread spectrum code utilized in the data signal. Thus, a single SAW device (100) effects both correlation and delay. The output signals on the output lines (102, 104) are processed by a circuit including multipliers (106, 110) and a phase shifter (108) to produce output data signals representing the received data.

7 Claims, 3 Drawing Sheets

SPREAD SPECTRUM SIGNAL DEMODULATOR

BACKGROUND OF THE INVENTION

This invention relates to digital data receivers, of the kind for demodulating a fixed code spread spectrum differential phase shift keyed received data signal, representing a succession of data symbols having a predetermined symbol rate.

Various types of modulation are known for transmitting digital data. One known type of modulation is quadrature phase shift modulation (QPSM), wherein a continuous wave (CW) signal is switched in phase between 0°, 90°, 180° and −90°. This gives four possible states per symbol, that is, two bits of information are transmitted per symbol. To demodulate such a signal, a coherent reference signal (an oscillator) is required as a phase reference. In order to obviate this problem, it is known to use a differential phase shift keyed signal structure (DPSK). With this signal structure, it is not the absolute phase of a symbol which represents the information, but the phase change between two adjacent symbols, which may be 0°, 90°, 180° or −90°. To demodulate such a DPSK signal, the phase of two adjacent symbols has to be compared.

It is also known, for data transmission, to employ spread spectrum systems. Spread spectrum communications systems employ a bandwidth which is greater than the data bandwidth. This provides several advantages, including a high resistance to interference, a greater tolerance to multipath signals, and lower spectral power density. One type of spread spectrum system, known as direct sequence spread spectrum (DSSS), effects a "spreading" function by modulating the information by a fixed pseudorandom code. For example, binary 0 and 1 level signals can be modulated, using an EXCLUSIVE-OR type gating device, with the individual bits of the fixed pseudorandom code, to produce a plurality of bits, known as "chips", representing the original binary 0 or 1 level signal. Thus, in the time of one symbol, many chips are present, whereby the spectral occupancy of the transmitted signal is increased, in accordance with the number of chips in one symbol period. In this manner, a so-called processing gain of the DSSS system is achieved.

A data transmission system utilizing spread spectrum encoding and differential phase shift keying modulation is known from U.S. Pat. No. 4,672,658, in an application to a wireless PBX network, used for voice and data communications. The receiver utilized in this known system employs a surface acoustic wave (SAW) matched filter correlator to effect a "despreading" operation, after which a demodulator demodulates the differential phase shift keyed signal. This known arrangement has the disadvantage of a complex and expensive implementation.

SUMMARY OF THE INVENTION

It is an object of the present invention to provide a digital data receiver of the kind specified, wherein the aforementioned disadvantage is alleviated.

Therefore, according to a preferred embodiment, of the present invention, there is provided a digital data receiver for demodulating a fixed code spread spectrum differential shift keyed received data signal (hereinafter referred to as received data signal) representing a succession of data symbols having a predetermined symbol rate comprising:

a surface acoustic wave device having a piezoelectric substrate, an input transducer located on said piezoelectric substrate, and first and second output transducers;

each of said first and second output transducers being matched to said fixed code of said received data signal and being relatively displaced on said substrate from said input transducer by a distance dependent on said symbol rate of said received data signal so as to produce respective first and second signals having a relative delay corresponding to a symbol period;

input means for applying said received data signal to said surface acoustic wave device;

first multiplying means for multiplying said first and second signals to provide a third signal;

phase shifting means for phase shifting said second output signal to provide a phase shifted second output signal;

second multiplying means for multiplying said first signal and said phase shifted second output signal to produce a fourth signal; and decision means responsive to said third and fourth signals to produce output data signals representing said received data signal.

A digital data receiver according to the invention provides further advantages, arising from the implementation on a single piezoelectric substrate. Thus, fewer acoustical-electrical energy domain transformations are needed, thereby reducing the need for amplification which would be needed to compensate for such losses. Furthermore, the bandwidth limiting effects which would be introduced by the use of a separate delay line are avoided. Finally, a precise matching of the delayed autocorrelation function is achieved since it is produced by an identical, but physically shifted transducer.

BRIEF DESCRIPTION OF THE DRAWINGS

A preferred embodiment of the present invention will now be described by way of example, with reference to the accompanying drawing, in which.

DETAILED DESCRIPTION OF A PREFERRED EMBODIMENT

Figure 1:
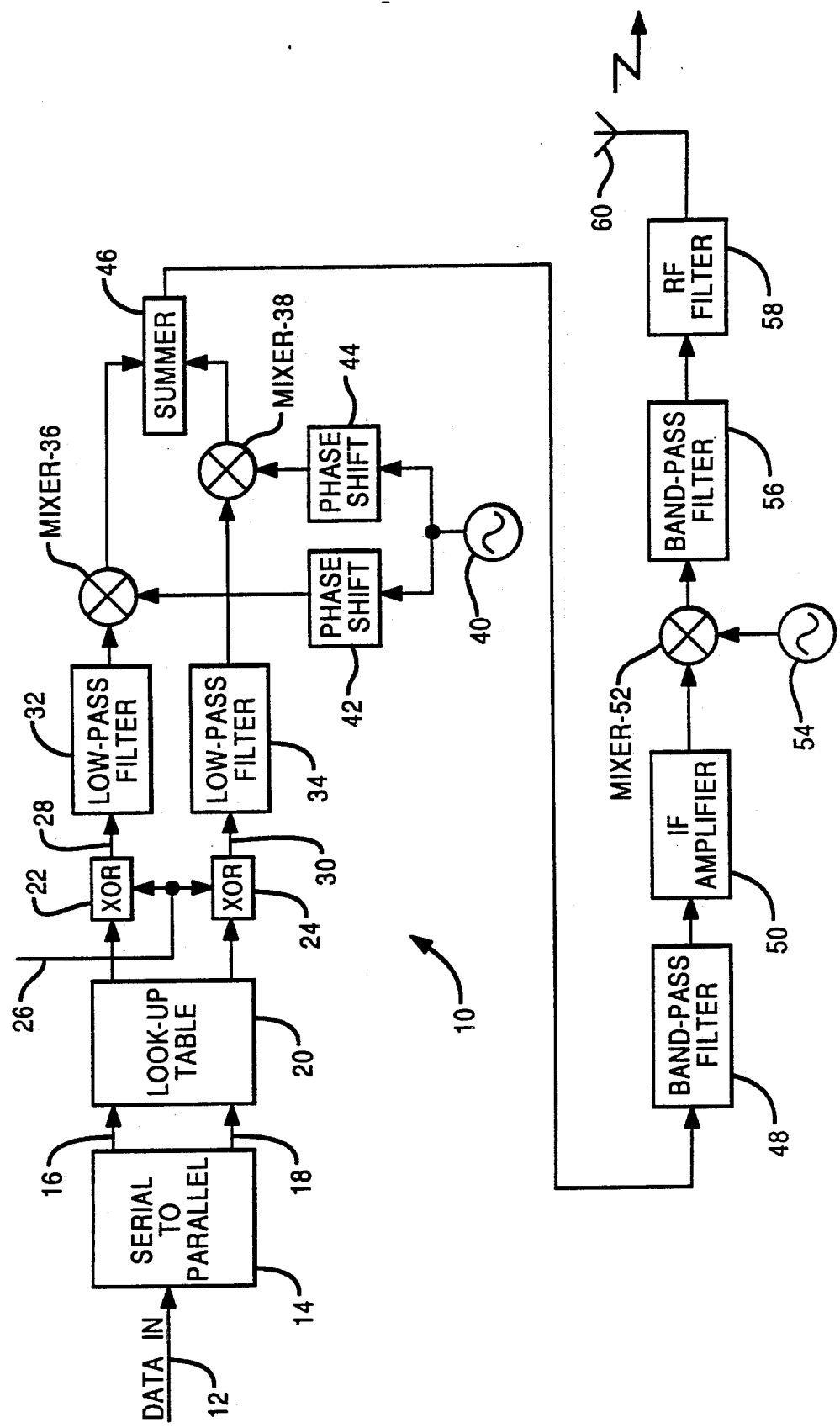
FIG. 1 is a block diagram showing a data transmitter for generating and transmitting a direct sequence spread spectrum differential phase shift keyed signal.

Referring first to FIG. 1, there is shown a block diagram of a transmitter 10 for generating and transmitting a direct sequence spread spectrum phase shift keyed signal representing input data. A binary input data signal is applied over an input line 12 to a serial-to-parallel converter 14 which provides in-phase and quadrature output signals on output lines 16, 18, respectively. These in-phase and quadrature signals are applied to a look-up table 20 which provides differentially encoded signals on in-phase and quadrature output lines coupled to respective modulo-2 adders (XOR gates) 22, 24, to which are also applied, via a line 26, signals representing a fixed, pseudorandom spreading code. In known manner, the spreading code converts the data symbols to sequences of shorter bits, called chips. The outputs of the modulo-2 adders 22, 24 are applied via lines 28, 30 to low-pass filters 32, 34, the outputs of which, forming base-band signals, are applied to mixers 36, 38. An intermediate frequency oscillator 40 has an output coupled to phase shift circuits 42, 44 which effect phase shifts of minus and plus 45°, respectively, and have outputs applied to the mixers 36, 38. The outputs of the mixers 36, 38 are applied to a summer 46. The output of the summer 46 is applied to a band-pass filter 48 having an output connected to an intermediate frequency amplifier 50, the output of which is coupled to a mixer 52 which also receives the output of a radio frequency oscillator 54.

The output of the mixer 52 is applied to a band-pass filter 56 having an output coupled to a radio frequency amplifier 58, the output of which is coupled to an antenna 60, whereby the direct sequence spread spectrum differential phase shift keyed signal is transmitted by radio signals to a remote location.

It should be understood that the transmitter 10 is merely exemplary and that other transmitter arrangements could be utilized to effect the generation and transmission of direct sequence spread spectrum differential phase shift keyed signals. For example, it would be possible to effect the spreading function after differential modulation, instead of prior to differential modulation in accordance with the FIG. 1 embodiment.

Figure 2:
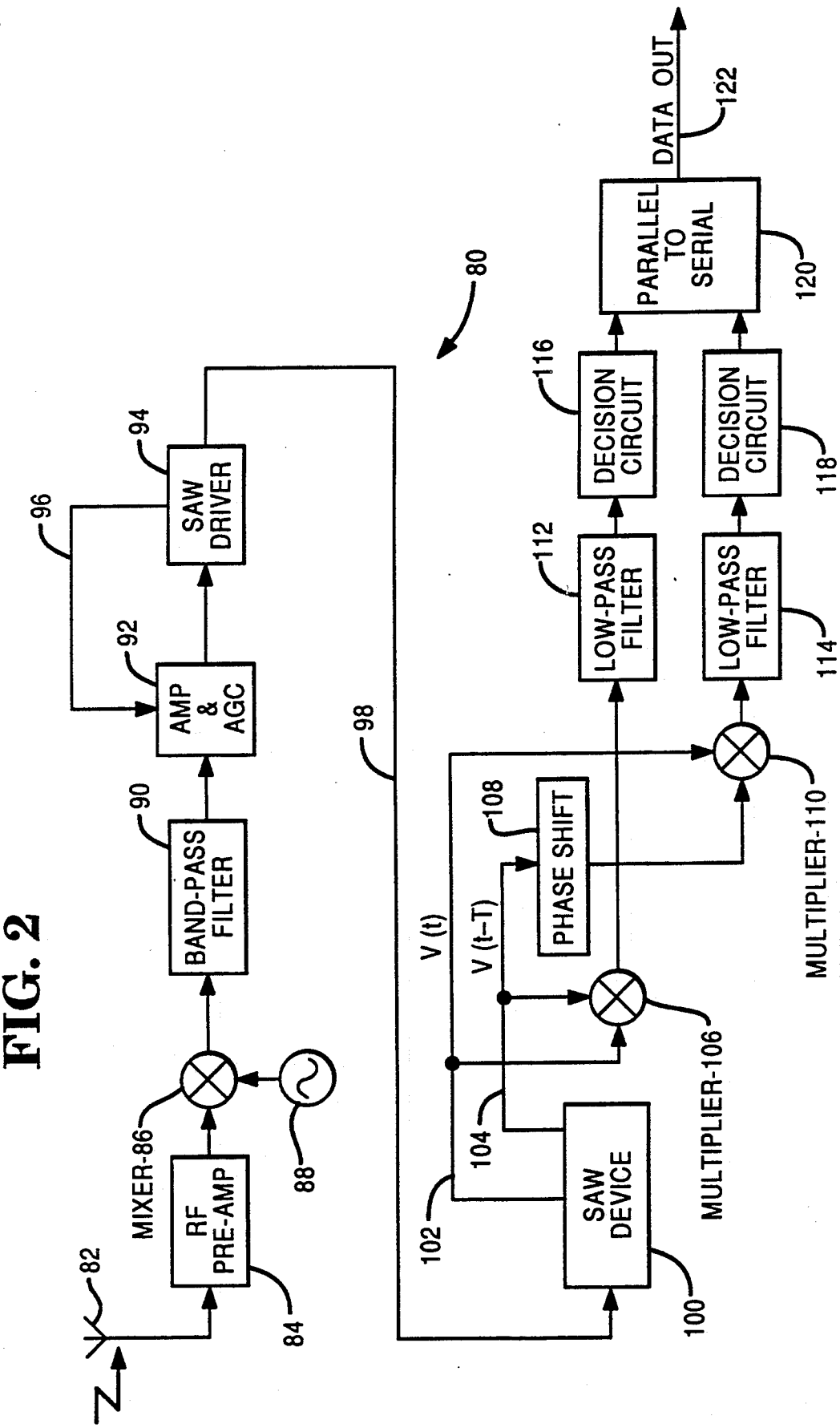
FIG. 2 is a block diagram showing a data receiver according to the invention for receiving the signal generated and transmitted by the circuit of FIG. 1.

Referring to FIG. 2, there is shown a receiver 80 for recording the signal transmitted by the receiver 10 and providing data output signals in accordance with the received signal. The transmitted signal is received by an antenna 82 which is connected to a radio frequency preamplifier 84, the output of which is connected to a mixer 86 which also receives the output of a radio frequency oscillator 88, thereby providing an intermediate frequency signal which is applied to a band-pass filter 90. The output of the band-pass filter 90 is applied to an amplifier and automatic gain control (AGC) circuit 92, the output of which is applied to a surface acoustic wave (SAW) driver circuit 94, which supplies a feedback signal over a line 96 to the amplifier and AGC circuit 92.

The output of the SAW driver circuit 94 is applied over a line 98 to a SAW device 100 which will be described in more detail hereinafter. The SAW device 100 has first and second outputs connected to output lines 102 and 104. As will be more fully explained hereinafter, the signals on the output lines 102, 104 are a time-dependent signal V(t) and a correspondingly delayed signal V(t−T) respectively, where T represents the symbol period. The signals on the lines 102, 104 are applied to a multiplier 106. The signal on the line 104 is phase shifted by 90° in a phase shift circuit 108, the output of which is applied to a multiplier 110. The outputs of the multipliers 106, 110 are applied via respective low-pass filters 112, 114 to respective 0/1 decision circuits 116, 118, thereby providing in-phase and quadrature signal components which are applied to a parallel-to-serial converter 120, the output 122 of which produces data output signals.

Figure 3:
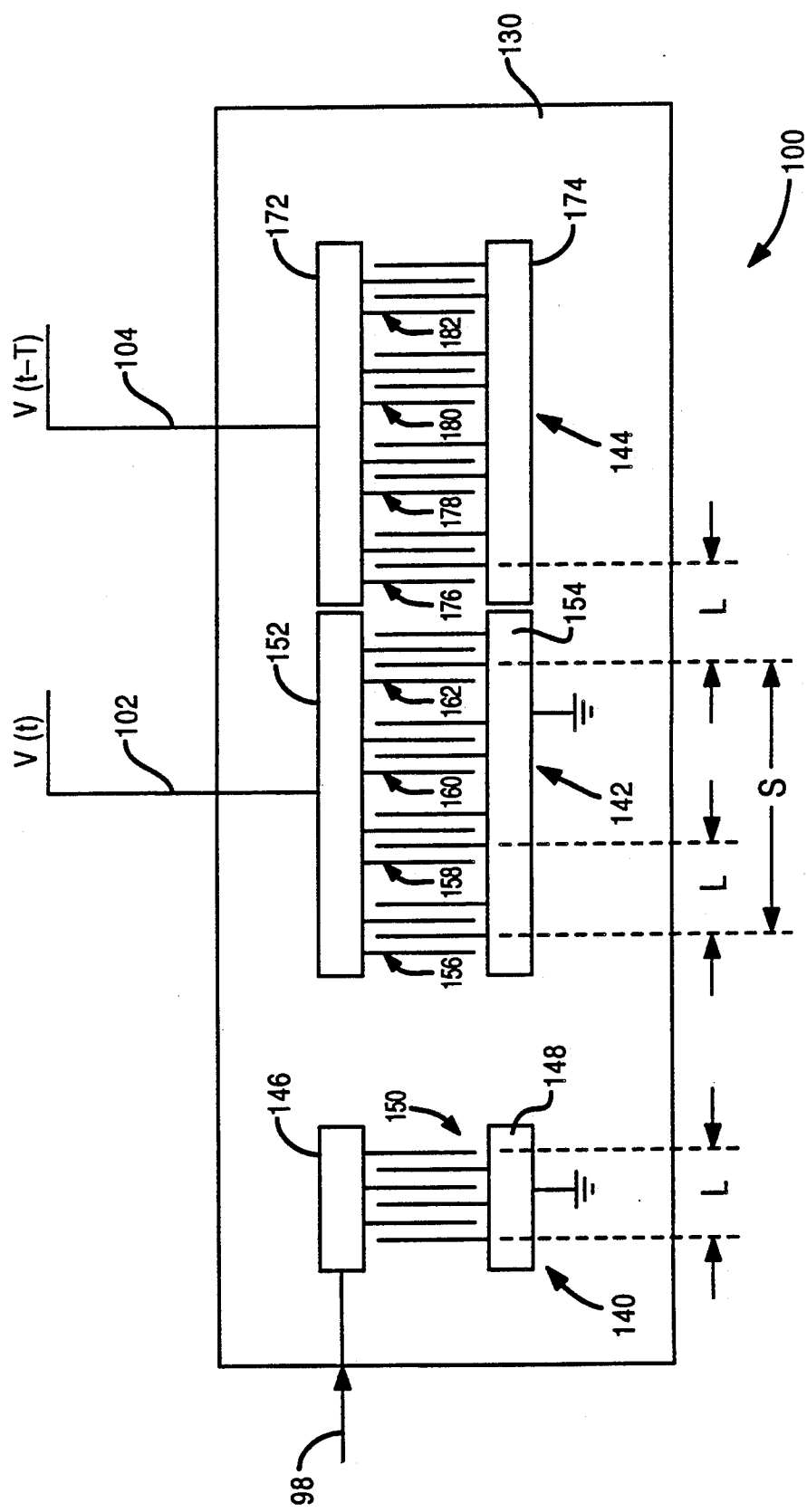
FIG. 3 is schematic diagram of the surface acoustic wave device shown in FIG. 2.

Referring now to FIG. 3, there is shown a schematic representation of the SAW device 100. The SAW device 100 includes an input transducer 140 and first and second output transducers 142, 144, which are of identical construction. The transducers 140, 142, 144 are mounted on a piezoelectric substrate 130, which may be of quartz. The input transducer 140 includes first and second metal electrodes 146, 148 and a plurality of metal fingers 150 (six are shown in FIG. 3), which are connected alternately to the electrodes 146, 148 as shown in FIG. 3. The input line 98 is connected to the electrode 146 and the electrode 148 is connected to ground.

The first output transducer 142 includes metal electrodes 152, 154 connected to the output line 102 and to ground, respectively. Connected to the metal electrodes 152, 154 are groups of metal fingers 156, 158, 160, 162. It should be understood that the number of groups of fingers provided corresponds to the number of chips in the spread spectrum code utilized, and that four such groups of fingers are shown by way of example, corresponding to a four-chip code. The fingers within each group are connected alternately to the electrodes 152, 154, with the order of connection being determined by the particular spread spectrum code utilized. Thus, the finger groups 156, 158, 162 have their first and third fingers connected to the electrode 152 and their second and fourth fingers connected to the electrode 154. In the finger group 160, however, the first and third fingers are connected to the electrode 154 and the second and fourth fingers are connected to the electrode 152. In the described exemplary arrangement, this corresponds to a fixed chip code 1101. It should be understood that in alternative arrangements the finger groups could contain fewer, for example two, or could contain more fingers than the four fingers shown in FIG. 3. Also, of course, there could be more, or fewer finger groups than the four groups shown, depending on the length of the chip code. The distance between the first and last finger groups 156, 162, that is, the length of the output transducer 142, is dependent on the symbol period T.

The second output transducer 144 includes electrodes 172, 174, corresponding to the electrodes 152, 154 of the transducer 142, and finger groups 176, 178, 180, 182, corresponding to the finger groups 156, 158, 160, 162 of the transducer 142. The transducer 144 is located on the piezoelectric substrate 130 such that the first group 176 thereof is spaced apart from the last finger group 162 of the transducer 142 by a distance equal to the uniform finger group separation of the transducers 142, 144.

Assume, for the general case, that the input transducer is of length L and has N fingers separated by a distance d, where $$L = (N-1)d.$$

With these values, the finger groups 156, 158, 160, 162, 176, 178, 180, 182 of the output transducers 142, 144, are all separated by the same distance L. These relationships correspond to a desired matched filter response for the output transducers, the length, S, of each of which is $S = L \cdot (M-1)$, where M is the number of chips in the chip code, and is also the number of finger groups in each of the output transducers 142, 144. It will be appreciated that $$L \cdot M/v = T$$

where v is the velocity of the acoustical wave in quartz (having a value in practice of 3158 meters per second), and T is the symbol period, referred to above. It will also be appreciated that the time taken for the acoustical wave to travel the distance L between the finger groups (the inter-tap delay), is equal to the chip duration. More generally stated, the inter-tap delay should be inversely proportional to the chip rate. A further point to be noted is that the fixed chip code utilized for the spread spectrum coding should be a time-reversed replica of that produced by the impulse response of either of the transducers 142, 144, to provide a matched filter, so that maximum correlation is achieved.

With these parameters being utilized, the impulse response time of the output transducer 142 corresponds to the symbol period T. Thus, the convolution of the signals produced by the finger groups 156–162 produces the correlation of the fixed code represented by these finger groups, resulting in autocorrelation peaks occurring at the symbol rate T. In this manner the desired "de-spreading" operation is effected.

The output signals on the lines 102 and 104 can be represented as V(t) and V(t−T) respectively, where t is the time variable and T is the symbol period. As described hereinabove, with reference to FIG. 2, the signals on the lines 102 and 104 are multiplied in the multiplier 106 and the signal on the line 104 is subject to a 90° phase shift (Hilbert transform) in the phase shift circuit 108 prior to a second multiplication being effected in the multiplier 110. Thus two independent data streams, corresponding to the in-phase and quadrature components are provided, such components being processed as described above, to provide the output data signals.

Although in the preferred embodiment, two bits of information are transmitted for each symbol, corresponding to a minimum phase change of 90°, it will be appreciated that it is possible to transmit a higher number of bits per symbol if a higher phase resolution in the phase change between symbols can be achieved.

In the preferred embodiment of the SAW device 100, the disposition of the three transducers 140, 142, 144 on the substrate 130 in an aligned configuration has the advantage that less substrate material is utilized than if the two output transducers 142, 144 were relatively displaced vertically from their positions shown in FIG. 3.

In summary, the present invention relates to a digital data receiver for demodulating a fixed code spread spectrum differential shift keyed received data signal (hereinafter referred to as received data signal) representing a succession of data symbols having a predetermined symbol rate comprising:
  a surface acoustic wave device (100) having a piezoelectric substrate (130), an input transducer (140) located on said piezoelectric substrate, and first and second output transducers (142,144);
    each of said first and second output transducers being matched to said fixed code of said received data signal and being relatively displaced on said substrate from said input transducer by a distance dependent on said symbol rate of said received data signal so as to produce respective first and second signals having a relative delay corresponding to a symbol period;
  input means (82–98) for applying said received data signal to said surface acoustic wave device;
  first multiplying means (106) for multiplying said first and second signals to provide a third signal;
  phase shifting means (108) for phase shifting said second output signal to provide a phase shifted second output signal;
  second multiplying means (110) for multiplying said first signal and said phase shifted second output signal to produce a fourth signal; and
  decision means (112–120) responsive to said third and fourth signals to produce output data signals representing said received data signal.

What is claimed is:

1. A digital data receiver for demodulating a fixed code spread spectrum differential shift keyed received data signal having a fixed code hereinafter referred to as received data signal, representing a succession of data symbols having a predetermined symbol rate comprising:
  a surface acoustic wave device having a piezoelectric substrate, an input transducer located on said piezoelectric substrate, and first and second output transducers;
  each of said first and second output transducers being matched to said fixed code of said received data signal and being relatively displaced on said substrate from said input transducer by a distance dependent on said symbol rate of said received data signal so as to produce respective first and second output signals having a relative delay corresponding to a symbol period;
  input means for applying said received data signal to said surface acoustic wave device;
  first multiplying means for multiplying said first and second output signals to provide a third signal;
  phase shifting means for phase shifting said second output signal to provide a phase shifted second output signal;
  second multiplying means for multiplying said first output signal and said phase shifted second output signal to produce a fourth signal; and
  decision means responsive to said third and fourth signals to produce output data signals representing said received data signal.

2. The digital data receiver as claimed in claim 1, in which said decision means includes:
  first and second decision circuits responsive, respectively, to said third and fourth signals; and
  parallel-to-serial conversion means coupled to said first and second decision circuits to provide said output data signals.

3. The digital data receiver as claimed in claim 2, in which each of said first and second output transducers includes first and second electrodes and a plurality of groups of metallic fingers, with the fingers of each group of said plurality of groups extending alternately from said first and second electrodes.

4. The digital data receiver as claimed in claim 3 in which said groups of metallic fingers are separated by a same predetermined distance.

5. The digital data receiver as claimed in claim 4 in which said input transducer and said first and second output transducers are arranged in a linear configuration on said substrate.

6. The digital data receiver as claimed in claim 5 in which said piezoelectric substrate is composed of quartz.

7. The digital data receiver as claimed in claim 6 in which said fixed code of said received data signal is a time-reversed replica of an impulse response of each of said first and second output transducers.

* * * * *